United States Patent [19]
Pompei

[11] Patent Number: 5,874,736
[45] Date of Patent: Feb. 23, 1999

[54] AXILLARY INFRARED THERMOMETER AND METHOD OF USE

[75] Inventor: Francesco Pompei, Boston, Mass.

[73] Assignee: Exergen Corporation, Watertown, Mass.

[21] Appl. No.: 738,300

[22] Filed: Oct. 25, 1996

[51] Int. Cl.[6] .................................................. G01J 5/26
[52] U.S. Cl. ................................. 250/338.1; 250/339.11
[58] Field of Search ......................... 250/338.1, 339.04, 250/339.11, 339.14, 341.8; 374/121; 128/664

[56] References Cited

U.S. PATENT DOCUMENTS

| | | | |
|---|---|---|---|
| 3,942,891 | 3/1976 | Spielberger et al. | 356/43 |
| 4,636,091 | 1/1987 | Pompei et al. | 374/124 |
| 4,662,360 | 5/1987 | O'Hara et al. | 128/9 |
| 4,911,559 | 3/1990 | Meyst et al. | 374/158 |
| 4,932,789 | 6/1990 | Egawa et al. | 374/126 |
| 4,993,419 | 2/1991 | Pompei et al. | 128/664 |
| 5,012,813 | 5/1991 | Pompei et al. | 128/664 |
| 5,017,018 | 5/1991 | Iuchi et al. | 374/130 |
| 5,179,936 | 1/1993 | O'Hara et al. | 128/9 |
| 5,229,612 | 7/1993 | Pompei et al. | 250/349 |
| 5,325,863 | 7/1994 | Pompei | 128/736 |
| 5,445,158 | 8/1995 | Pompei | 128/664 |

FOREIGN PATENT DOCUMENTS 0 565 123 A1  10/1993  European Pat. Off. .

OTHER PUBLICATIONS

Sketch, IR–Onics "Derma–Thermo–Graph," by Dermathorm Corp. (No Date).

Pompei, Francesco et al., *Physicians Reference Handbook on Temperature: Vital Sign Assessment With Infrared Thermometry*, 1996.

The Ototemp LighTouch Neonate Reference Book–Exergen Corporation (No Date).

*Primary Examiner*—Edward P. Westin
*Assistant Examiner*—Richard Hanig
*Attorney, Agent, or Firm*—Hamilton, Brook, Smith & Reynolds, P.C.

[57] ABSTRACT

A radiation detector for axillary temperature measurement comprises a wand having an axially directed radiation sensor at one end and an offset handle at the opposite end. The radiation sensor is mounted within a heat sink and retained by an elastomer in compression. The radiation sensor views a target surface through an emissivity compensating cup and a plastic film. A variable reference is applied to a radiation sensor and amplifier circuit in order to maintain full analog-to-digital converter resolution over design ranges of target and sensor temperature with the sensor temperature either above or below target temperature.

13 Claims, 10 Drawing Sheets

AXILLARY INFRARED THERMOMETER AND METHOD OF USE

BACKGROUND

Neonates are incapable of maintaining their own body temperature during the first few weeks of life. Skin perfusion rates are very high and the infant loses heat rapidly. Thermal management is critical, requiring an accurate, fast, noninvasive method of core temperature measurement.

Rectal temperature has long been considered to be the standard indicator of neonate core temperature. However, since temperature measurements from different locations on a neonate's skin are sufficiently uniform as to be relatively interchangeable with one another, the clinician may select the most noninvasive and convenient site at which to measure temperature. Due to its inherent safety and long established efficacy, axilla (underarm) is the most recommended site for neonates. Unfortunately, conventional thermometers such as glass/mercury, electronic and paper strip thermometers require up to several minutes to obtain an accurate axillary reading.

In recent years, infrared thermometers have come into wide use for detection of temperature of adults. For core temperature readings, infrared thermometers which are adapted to be inserted into the patient's ear have been extremely successful.

Infrared ear thermometry has not found such high acceptance for use with neonates. Neonates have a very high moisture level in their ear canals, due to the presence of vernix and residual amniotic fluid, resulting in low tympanic temperatures because of the associative evaporative cooling. In addition, environmental uncertainties, such as radiant heaters and warming pads can significantly influence the air temperature. Further, clinicians are less inclined to position the tip of an infrared thermometer in the ear of a small neonate.

An infrared thermometer designed for axillary temperature measurements is presented in U.S. patent application Ser. No. 08/469,484. In that device, an infrared detector probe extends from a temperature display housing and may easily slide into the axilla to lightly touch the apex of the axilla and provide an accurate infrared temperature reading in as little as one-half second.

The axillary infrared thermometer has found great utility not only with neonates but as a screening tool in general and especially for small children where conventional temperature measurements such as a thermometer under the tongue or a rectal thermometer are difficult. The axillary measurement is particularly accurate with children where there is a lack of axillary hair and perspiration.

SUMMARY OF THE INVENTION

The present invention has particular applicability to an axillary infrared thermometer which is suitable for nonclinical use but which retains the accuracy required for clinical use.

In accordance with one aspect of the invention, the thermometer comprises an extended housing forming a wand which has a handle portion at one end and a radiation detection portion at the other end. The wand configuration allows the device to be passed through the sleeve of the patient to the axilla to minimize exposure of the patient to the surrounding environment. Further, the housing surface is formed of a low thermal-conductivity material to minimize cooling of the patient with contact against the skin. The radiation detection portion of the housing comprises an axially directed window positioned within a cup. The window passes radiation to an infrared radiation sensor within the housing from a field of view substantially less than the area of the cup opening.

In accordance with another aspect of the invention, the handle portion of a radiation detector housing, preferably configured as a wand, extends along an axis generally parallel to the viewing axis but offset from the viewing axis.

In accordance with another aspect of the invention, the cup is designed to conduct heat from the target area in order to match the heat loss from the target area when the radiation detector is not in place, thereby minimizing changes in target temperature.

In accordance with another aspect of the invention, the radiation sensor is mounted within a large thermal mass within the low conductivity housing to provide an RC time constant for change in temperature of the radiation sensor, with change in temperature to which the housing is exposed, of at least 5 minutes and preferably 25 minutes.

In accordance with another aspect of the invention, a transparent plastic film is positioned over the cup to minimize the effects of evaporation from the target surface. The thickness of the film is at least 1.1 mils. and is preferably 1.5 mils.

In a preferred configuration, the radiation sensor is mounted within a can for viewing a target through an infrared transparent window on the can and through an aperture at the base of an emissivity compensating cup. The can is mounted within a bore in a heat sink with thermal coupling to the heat sink through a rear flange. The flange may be pressed against a shoulder by an elastomer such as an o-ring. A rear cap fit to the heat sink presses against the elastomer to press the can against the shoulder. Preferably, the cap is an externally threaded plug which fits within the bore. The cap has an opening therein through which electrical leads to the radiation sensor pass.

In accordance with another aspect of the invention, a novel detection circuit is provided. A radiation sensor provides an output as a function of difference between target temperature and sensor temperature over a design range of target temperatures and a design range of sensor temperatures. An amplifier amplifies the sensor output and an analog-to-digital converter generates a multibit digital output from the amplified output over a voltage range of the amplified sensor output. A reference to the radiation sensor and amplifier circuit is variable to provide high analog-to-digital converter resolution, over the design ranges of target and sensor temperatures, with sensor temperatures either above or below target temperature. The resolution is greater than would be obtained with a fixed reference over full design ranges of target and sensor temperatures. The variable reference provides a variable offset which may be subtracted out in digital processing circuitry prior to digital computation of target temperature.

In the preferred detection circuit, the reference is variable to offset the amplified output by an offset level approximating sensor temperature. The amplified sensor output then approximates target temperature. In an alternative embodiment, the reference is set at one of two levels depending on whether target temperature is above or below sensor temperature. In one implementation of that embodiment, the reference is set to one of those two levels only after the amplified output has exceeded the analog-to-digital converter range using an intermediate reference.

In each embodiment of the detector circuit, the reference level is preferably set while also compensating for amplifier offset. The radiation sensor is isolated from the amplifier and the amplified output is varied either to approximate the sensor temperature or to set the amplifier output at one of three levels corresponding to the two reference levels. Preferably, a resistor which balances the resistance of the radiation sensor is also isolated from the amplifier during the offset calibration.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
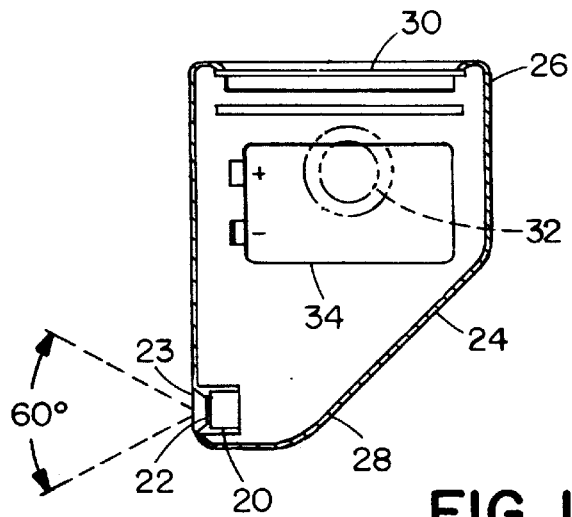
FIG. 1 is a cross-sectional view of one embodiment of the invention.

FIG. 1 illustrates a compact form of a radiation detector designed for axillary temperature measurement. It includes a conventional thermopile radiation sensor in which the thermopile is mounted in a can 20 having a window 22 through which the sensor views a target. As illustrated, the field of view of the sensor is about 60° and is through a reflective cup 23 having an angle of about 90°. The housing 24 in which the sensor is mounted has a handle portion 26 which extends in a direction generally parallel to the line of sight of the radiation sensor but which is offset therefrom. Accordingly, the sensor end 28 of the housing may be readily slid into the axilla with the housing held to the front of the patient. A liquid crystal display 30 provides a temperature reading after a button 32 is pressed. The radiation detector is powered by a single battery 34.

Figure 2A:
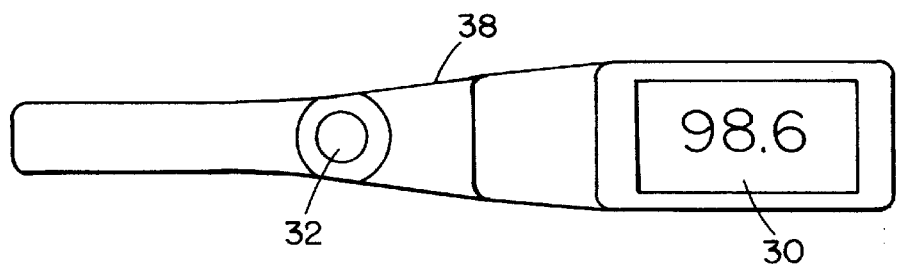
FIGS. 2A and 2B are orthogonal side views of another embodiment of the invention.
Figure 2B:
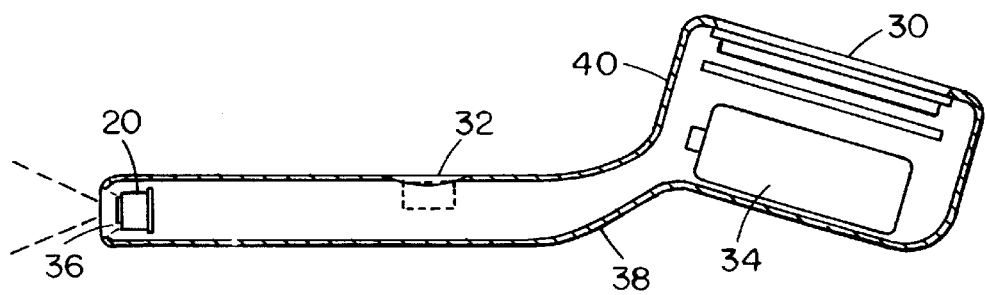

FIGS. 2A and 2B illustrate another embodiment in which the detector housing takes the form of an extended wand. The same radiation sensor views the target through a cup 36 at a distal end of the housing 38. The handle portion 40 is again offset from the viewing axis of the center 20 and extends along an axis which is generally parallel (i.e., within about 20°) to the line of sight of the radiation sensor, but in this case the handle portion is at a proximal end of the extended probe. This design facilitates insertion of the radiation sensor end of the housing through the sleeve of a patient to minimize heat loss from the patient during the measurement. To that end, the wand is about 10–20 centimeters long. As before, a liquid crystal display 30 provides a temperature reading after the button 32 is pressed. Again, the radiation detector is powered by a single battery 34.

Figure 3:
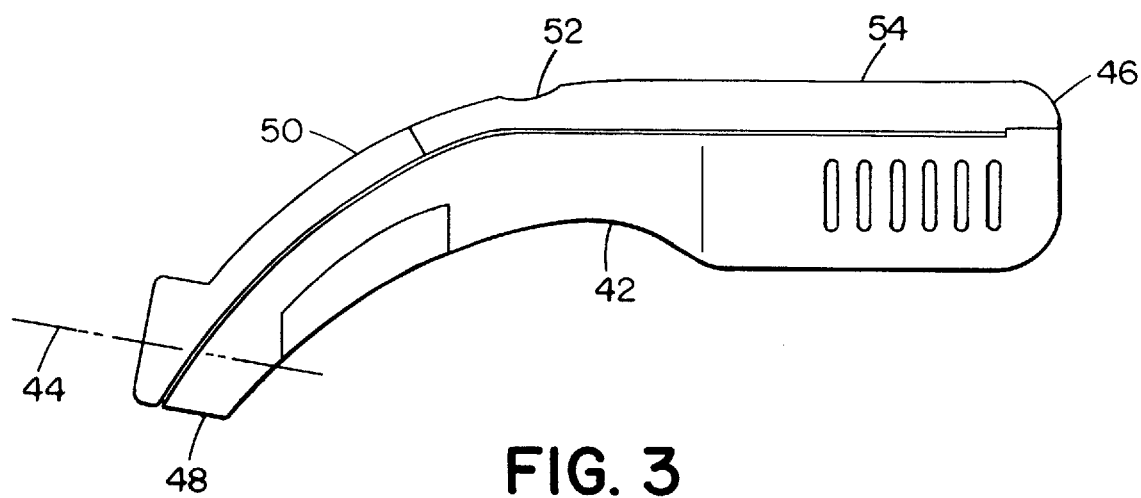
FIG. 3 is a side view of a preferred embodiment of the invention.

FIG. 3 illustrates a preferred embodiment of the radiation detector. Again, the housing takes the form of an extended wand having a radiation sensor at a distal end thereof which views the target along a viewing axis 44. A handle portion 46 is provided at the proximal end of the wand and is again offset from the viewing axis 44. Again, the handle portion extends along an axis which is generally parallel to the viewing axis 44, though angled about 10° from true parallel. The handle portion 46 is joined to the viewing portion 48 along a curved section 50 which includes a switch button 52. A reading is provided on a display 54.

Figure 4:
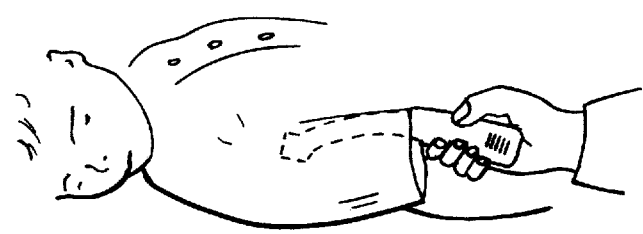
FIG. 4 illustrates use of the embodiment of FIG. 3 with an infant.

Use of the embodiment of FIG. 3 is illustrated in FIG. 4. As can be seen, the extended probe can readily be slid into the axilla through the child's sleeve. The offset of the handle portion enables it to be easily held in front of the patient.

Not only is the use of the wand through the sleeve better for the patient in minimizing heat loss, it improves the temperature measurement by avoiding cooling of the target area. As disclosed in U.S. Pat. No. 5,445,158, the actual temperature of the target surface is offset from the desired core temperature by an amount determined by the surrounding ambient temperature. Ambient temperature controls the amount of heat loss from the target area and the thermal difference between core temperature and surface temperature. That temperature difference can be compensated electronically by computing a core temperature $T_C$ from the sensed target temperature $T_T$ and a sensed ambient temperature $T_A$ with a known coefficient K as follows:

$$T_C = T_A + K(T_T - T_A)$$

However, the degree of compensation can be minimized or even eliminated if exposure of the target area to ambient temperature is minimized.

With the wand positioned through the sleeve, the contact of the wand to the axilla is not visible to the clinician. Accordingly, to assure that the actual axilla temperature is obtained, the wand may be pivoted to scan the region, with the electronics providing a peak temperature detection as in U.S. Pat. No. 5,445,158. In that prior system, the peak detection algorithm was processed as long as the button on the radiation detector was pressed. In the present system, the button is pressed once and the peak detection continues until the temperature stabilizes. The probe can be scanned with the clinician viewing the temperature display to locate the location of highest temperature. However, since the detector is surrounded by the target area, scanning becomes less critical.

Figure 5:
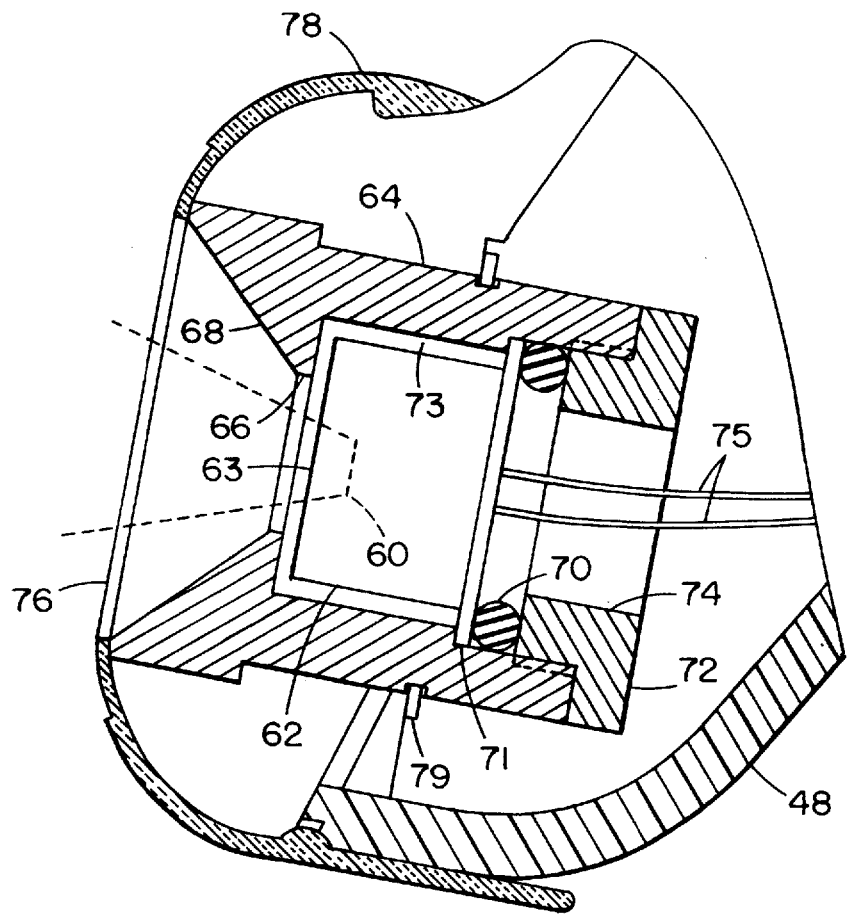
FIG. 5 a cross-sectional view of the radiation sensor assembly in the embodiment of FIG. 3.

FIG. 5 illustrates the sensor assembly of the radiation detector of FIG. 3. A thermopile 60 is mounted within a can 62 in conventional fashion. For high stability the thermopile may be a vapor deposited thermopile surrounded with xenon gas, but for reduced cost it is preferably a semiconductor thermopile surrounded with air. An infrared radiation transparent window 63 is provided over a viewing opening in the can. The can 62 is set within a bore within a heat sink 64. A shoulder defines an aperture 66 at the base of a conical cup 68 through which the thermopile views the target. The cup is preferably of low emissivity in order to provide emissivity compensation as disclosed in U.S. Pat. No. 4,636,091. Preferably, the heat sink 64 in which the cup is formed is of aluminum. Alternatively, the heat sink may be of brass, nickel plated in the cup region. With the rim pressed against the shoulder and having a close tolerance with the larger diameter of the bore an air gap 73 is maintained about the side and front of the can.

An elastomeric o-ring 70 is positioned behind the can 62. A plug 72 is threaded into the bore in the heat sink 64 to press the ring 70 against the rear flange 71 of the can and thus press the flange against a shoulder in the heat sink bore. This arrangement provides for good thermal contact between the can and the heat sink 64 at the rear and also makes the thermopile highly resistant to mechanical shock since the shock is only transferred through the thin rim past the shock absorbing elastomer. If the flange were rigidly clamped between metal parts, there would be a danger of shock breaking the gas seal of the can. An opening 74 is provided through the center of the plug 72 for access of electrical leads 75 to the thermopile can.

The heat sink assembly is mounted to the housing by sliding it into an opening at the distal end of a front housing section and retaining it with a snap ring 79. Then the rear housing section is connected to the front section.

The plastic housing 48 in which the sensor assembly is mounted is of low thermal conductivity, preferably less than one hundredth that of aluminum. The housing thermally isolates the heat sink 64 from the surrounding environment to minimize heat flow to the heat sink. Further, the heat sink 64 is of significant thermal mass. Accordingly, the RC time constant for change in temperature of the radiation sensor, with change in temperature to which the housing is exposed, can be made large for a more stable temperature reading. The thermal resistance is made high by the low conductivity housing, and the thermal capacitance is made high by the large mass of the heat sink 64. That RC time constant should be at least 5 minutes and is preferably about 25 minutes.

Past designs of infrared thermometers, such as presented in U.S. Pat. No. 4,993,419, have relied on a massive thermopile can which also served as the heat sink. That design assured a high RC time constant for thermal conduction through the external thermal barrier to the heat sink relative to a thermal RC time constant for temperature response of the cold junction to heat transferred to the heat sink. The latter low RC time constant was obtained by assuring a low thermal resistance to the cold junction using expensive high conductivity material in a specially designed can/heat sink. In the present device, a design goal is to use a conventional low cost thermopile mounted in a light weight can which does not provide the low thermal resistance of the prior design. Accordingly, it is important that the can be mounted to assure that all heat conduction to the thermopile be through the rear of the can which serves as the thermal ground to the thermopile. That objective is obtained by making thermal contact to the can through the rear flange and assuring an air space about the sides and front of the can.

Forming the emissivity compensating cup 68 in the heat sink reduces the cost of the assembly and also improves the thermal characteristics. Although the emissivity of the cup is ideally zero, it is in fact about 0.1. With the cup formed as part of the heat sink, it is at the temperature to which the can is grounded. Accordingly, any thermal emissions from the surface 68 will be at substantially the same temperature as the cold junction and thus not be seen. The electronics can also be calibrated to compensate for the loss of reflectance due to non-ideal emissivity, but that calibration is affected by the temperature of the reflective surface. By assuring that the surface 68 is at the temperature to which the thermopile can is grounded, the temperature of the surface is generally known and compensation can be made temperature dependent.

When adapted to household use, concerns for patient cross-contamination associated with clinical temperature detectors is not so significant. Accordingly, the disposable radiation transparent covers used in prior infrared thermometers, such as in Ser. No. 08/469,484, are not required. However, for purposes of accuracy of measurement, it is still important that a thin transparent film be provided over the viewing area. Without the film 76, any evaporation from the moist axillary region would result in a temperature reduction at the target surface and reduced accuracy in the temperature reading. However, the film can be pressed against the target surface, thus trapping the moisture and preventing evaporation. The thin film quickly equilibrates to the temperature of the target surface for an accurate reading.

In prior infrared thermometers in which the film was not contacted to the target, it was important that the thickness of the film be minimized. Such films have generally been described as being of less than 0.001 inch thickness, but thicknesses of less than 0.0005 inch have been preferred to minimize absorption of the radiation in the film and the resultant heating of the film which would lead to inaccurate readings. With the present application, where the film contacts the target surface, the film not only allows a change in temperature, but the temperature is forced to change to the target temperature. Accordingly, absorption of radiation is no longer a concern. Now the limitation in thickness is the need to obtain a quick equilibration with the target surface. Further, since the film must be more durable in order to obtain repeated measurements while contacting the target surface, a thickness of greater than 0.0011 inch is important. In the preferred embodiment, a proper balance between durability and quick thermal response is obtained with a film thickness of about 0.0015 inch. As before, polyethylene is the preferred film material.

Accordingly, a thin plastic film 76, for example of 0.0015 inch thickness, is stretched across the cup of the heat sink 64. The film need only be replaced periodically with wear and may be attached to the end of the housing with a formed sleeve 78 or the like. For example, the sleeve may be injection molded with the film ultrasonically welded to it. The sleeve is sufficiently thick to serve as a thermal insulator between the patient and the heat sink 64.

Figure 6:
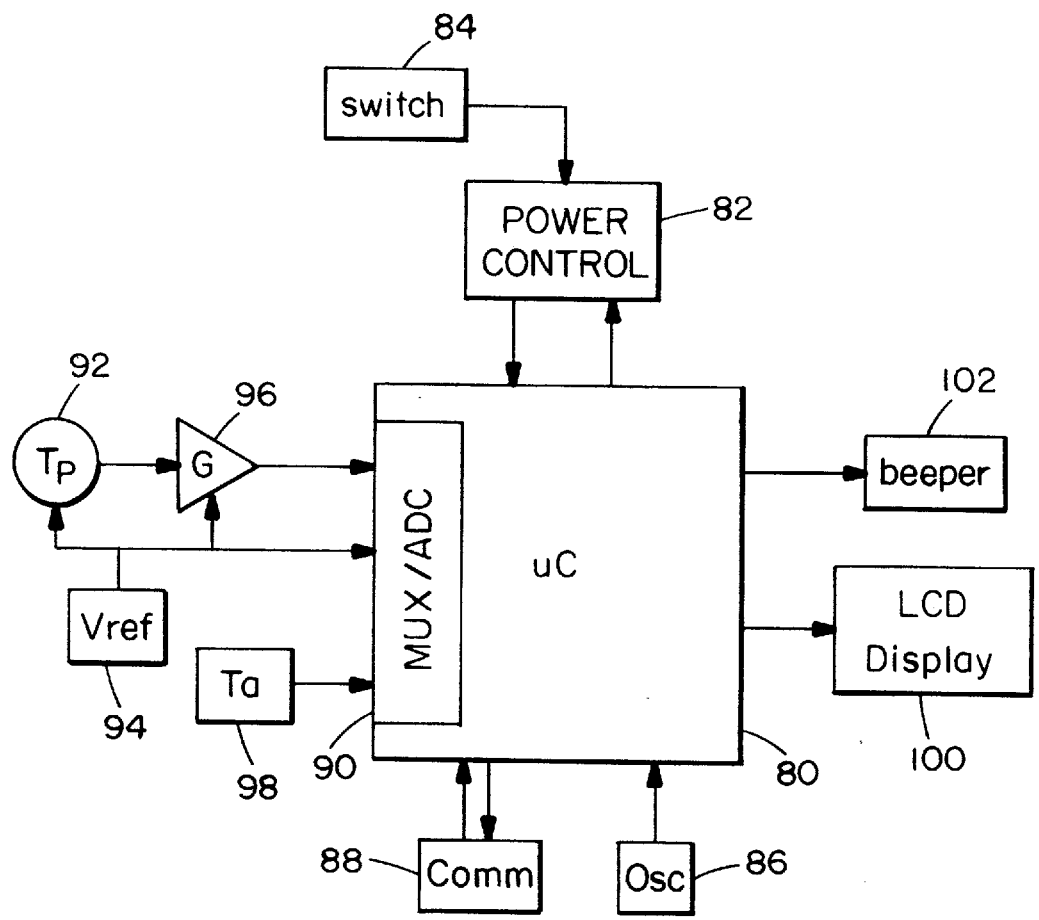
FIG. 6 is an electrical block diagram of one implementation of the invention.
Figure 7:
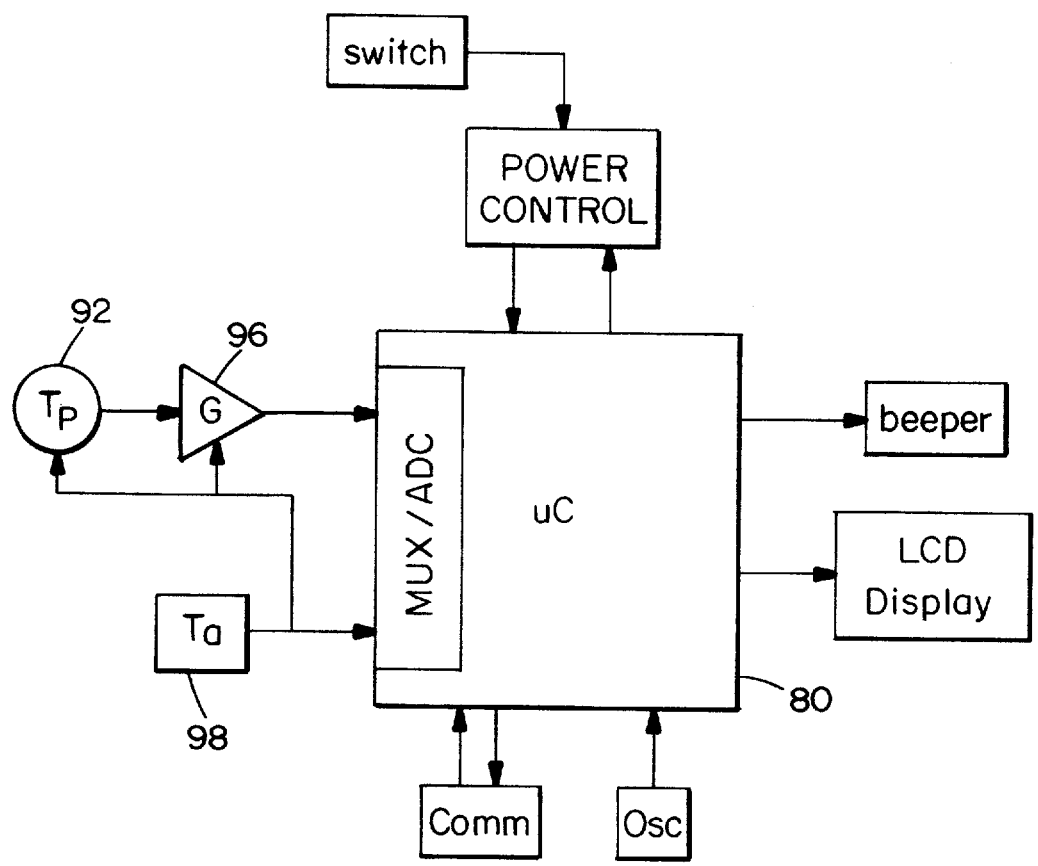
FIG. 7 is an electrical block diagram of an improved implementation of the invention.
Figure 8:
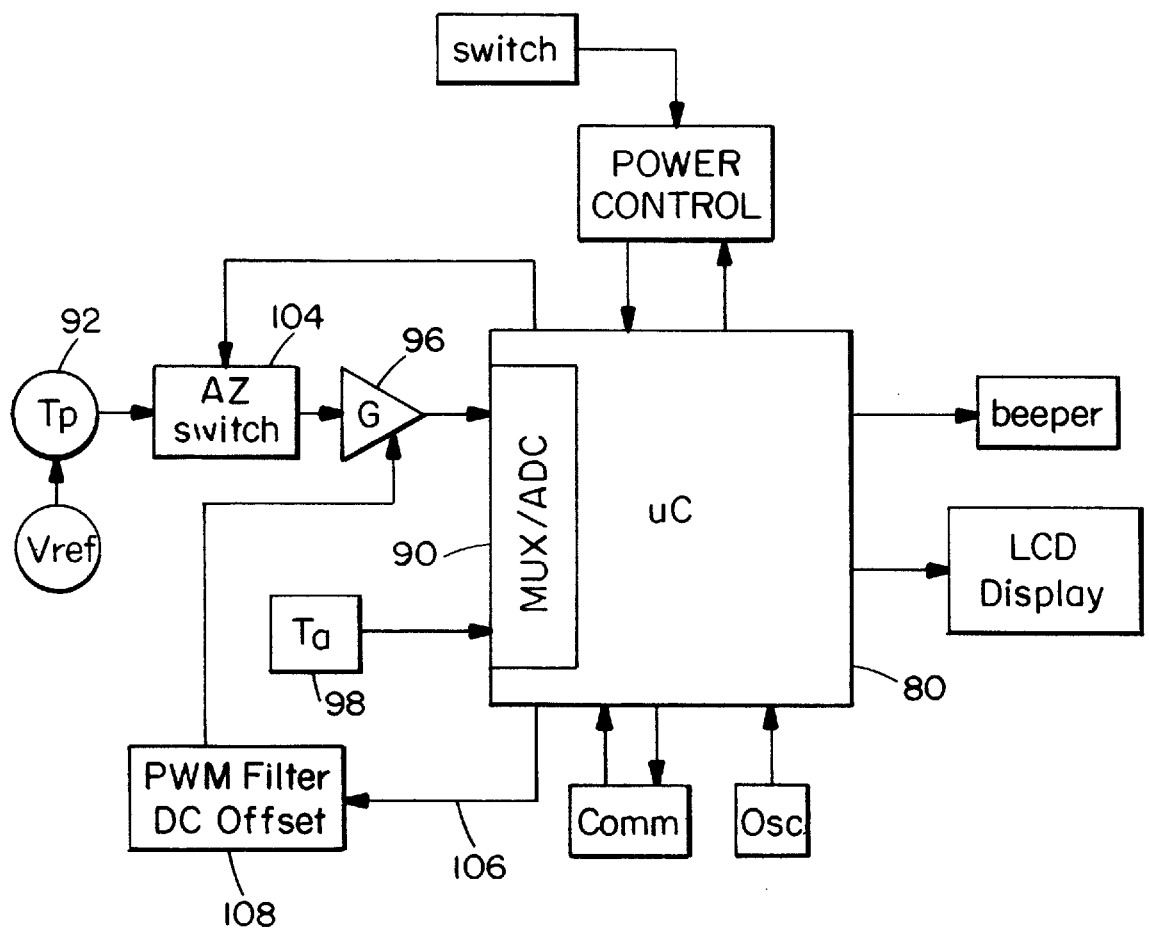
FIG. 8 is an electrical block/diagram of the preferred implementation of the invention.

Electrical block diagrams for three implementations of the radiation detector are presented in FIGS. 6–8. In each implementation, a microprocessor 80 is at the heart of the circuit. A power control circuit 82 responds to activation of the button switch 84 by the user to apply power to the microprocessor and other elements of the circuit. That power is maintained until the microprocessor completes the measurement cycle and signals the power control 82 to power down. The microprocessor is clocked by an oscillator circuit 86 and may communicate with an external source for programming and calibration through communication conductors 88. The temperature determined by the microprocessor is displayed on the liquid crystal display 100, and completion of the temperature processing is indicated by a beeper 102. During the measurement process, the microprocessor takes readings through an internal multiplexer/analog-to-digital converter 90. The preferred microprocessor 80 is a PIC16C74 which includes an internal 8-bit A-D converter. To minimize expense, the circuit is designed to rely solely on that A-D converter.

With reference to FIG. 6, thermopile 92 provides a voltage output signal equal to the fourth power difference between target temperature and the temperature of the thermopile cold junction, offset by voltage reference 94 to the thermopile. The voltage output from the thermopile is amplified by an amplifier 96, having a gain in the order of 1000, which also provides an offset. Through operation of the multiplexer, the microprocessor provides an analog-to-digital conversion of the amplified sensor output, of the thermopile and amplifier reference voltage 94 and of an ambient temperature provided by temperature sensor 98.

The microprocessor utilizes the measured voltage reference signal 94 to determine and allow for electrical offsets in the circuit. The temperature sensor 98 is positioned to sense the substantially uniform temperature of the thermopile cold junction, can and heat sink. With long thermal time constants, that temperature is also considered to be the same as ambient temperature during the short temperature reading. The microprocessor relies on the sensed temperature $T_A$ to compute target temperature $T_T$ from the relationship $(T_T^4-T_A^4)$ to which the thermopile output is proportional. The microprocessor may also compute core temperature from the core temperature relationship noted above.

ASTM standards dictate that the infrared thermometer operate correctly over a range of ambient temperature of 16°–40° C. and provide accurate temperature readings of target temperatures ranging from 22°–40° C. A design goal of the present radiation detector was to provide accuracy of 0.1° C. over the full 24 degree range of 16°–40° C. Thus, the 8-bit analog-to-digital converter must be able to convert readings within a 24° range without saturation at either end of that range. With a full range of 24° and 0.1° accuracy, 240 analog levels are required. The 256 levels processed in an 8-bit conversion would appear sufficient. However, the input to this A-D converter actually approximates the difference between target temperature and sensor (ambient) temperature, and that difference may be up to 24° positive or negative. Allowing for the target temperature to be either above or below the ambient temperature by 24° necessitates a reduction in A-D converter resolution by one half in order to convert the full ±24° C. range without saturation of the analog-to-digital converter.

One approach to obtain the 0.1° C. accuracy over the full 24° temperature range with an 8-bit converter, regardless of whether the sensor temperature is above or below target temperature, is to control the value of the voltage reference 94 according to the particular environmental conditions. For example, if the readings indicate that the target temperature is greater than the sensor temperature, the reference to the thermopile can be set at zero and the converter can convert the full 24° range of target temperature above sensor temperature without saturation. If, however, the target temperature were to drop below sensor temperature with that zero offset, the resultant negative value would saturate the analog-to-digital converter at the lower end. In that case, it is necessary to provide a sufficient voltage reference 94 to the thermopile to assure that the decrease in thermopile output with more negative target temperature does not bring the input to the A-D converter to zero. The maximum input to the A-D converter then results from a zero temperature difference and the zero input to the A-D converter results from the maximum temperature difference. The voltage reference is controlled by the microprocessor 80, and the microprocessor is programmed to process the different algorithms depending on the relative temperatures which dictate the voltage reference.

An alternative approach is to initially set the voltage reference 94 midway between the two extreme offset references discussed above. In that case, so long as the target and ambient temperatures are within 12° C. of each other, the output from the amplifier 96 is within the full range of the analog-to-digital converter. If the microprocessor senses saturation of the A-D converter, however, it changes the voltage reference to the high or low value accordingly. In each case, the microprocessor processes the received data according to the reference voltage that it applies.

FIG. 7 illustrates an alternative approach by which the output of the amplifier 96 can be maintained within the acceptable range of the analog-to-digital converter for full 0.1° C. resolution regardless of where the target and sensor temperatures fall within the design temperature ranges and without the need for determining whether the target temperature is above or below the sensor temperature. In this approach, the sensor ambient temperature $T_A$ provides the voltage reference to the thermopile. Thus, if the ambient temperature were at 16° C., the minimal offset would be provided to the thermopile 92 and the output of the thermopile would be proportional to $(T_T^4-T_A^4)$ through the full range of possible target temperatures. On the other hand, if the ambient temperature were at 40° C., the maximum offset would be provided to the thermopile and the output of the thermopile would be proportional to that maximum offset minus a voltage proportional to $(T_T^4-T_A^4)$. Accordingly, the microprocessor subtracts that offset before computing target temperature. If the ambient temperature is at any level between the minimum and maximum design temperatures, the offset applied to the thermopile is set at a corresponding value between the minimum and maximum offsets. By sliding the offset with sensor temperature, it is assured that the output of amplifier 96 is within the 8-bit range of the analog-to-digital converter, regardless of the level of the target temperature, so long as the target temperature is within the design range. The microprocessor only has to subtract that offset from the sensed voltage prior to computing target temperature from the value $(T_T^4-T_A^4)$.

The above discussion presents a design technique which allows for the highest resolution using the 8-bit analog-to-digital converter regardless of target and ambient temperatures within the 16°–40° C. design temperature ranges. However, the discussion has not taken into consideration electrical offsets in the circuitry. It is desirable to minimize the costs of the analog circuitry, but less expensive circuit elements result in substantially higher amplifier offsets. Further, the offset itself is temperature dependent, and the high gain is applied to any changes in offset. Accordingly, with an inexpensive amplifier, changes in electrical offsets with temperature can alone exceed the available input range of the analog-to-digital converter.

In accordance with the approach of FIG. 8, the voltage offset to the amplifier is controlled to account for whether the target temperature is above or below ambient temperature, as discussed above, and also to compensate for wide variations in electrical offset to permit use of relatively inexpensive analog circuitry. The thermopile voltage reference is fixed at a level that assures that the thermopile output is always an acceptable positive input to the amplifier. An auto zero switch 104 is included to allow for isolation of the amplifier 96 from the thermopile 92 during a calibration sequence. During that sequence, the microprocessor provides a pulse width modulated output on line 106 which is filtered by a filter 108 to produce an offset level applied to the amplifier circuit. With the thermopile isolated from the amplifier, the amplifier output can be adjusted using the electrical offset to set the output of the amplifier 96 at the level dictated by the considerations discussed above.

Specifically, in the first approach, the output of amplifier 96 is adjusted to one extreme of the analog-to-digital converter range depending on whether the target temperature is higher or lower than the sensor temperature. In the modification to that approach, the output of the amplifier 96 is initially set at an intermediate level. In the final embodiment, the offset applied to the amplifier 96 is selected to set the amplifier output at a level which approximates the ambient temperature sensed by sensor 98. In each case, the electrical offset of the amplifier is balanced out, leaving only the offset required to keep the A-D converter within range.

After calibration, the thermopile is again connected into the circuit using switch 104, and the output from amplifier 96 becomes the voltage determined by $(T_T^4-T_A^4)$ plus the voltage offset which had been set by the microprocessor to maintain full resolution within the design temperature range. The target temperature is then computed by first subtracting the applied offset and then determining target temperature with knowledge of the sensor temperature.

Figure 9A:
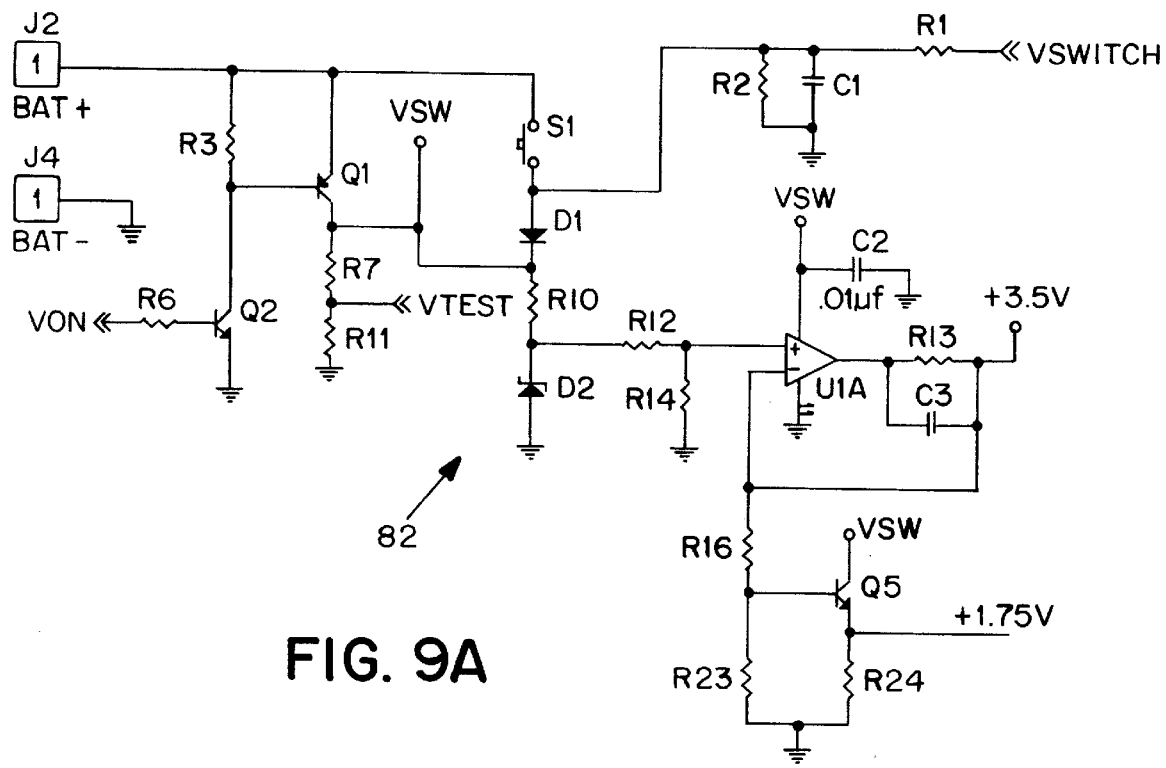
FIGS. 9A, 9B and 9C are detailed electrical schematics of the power control circuit, ambient temperature detection circuit and sensor amplification circuit, respectively, of FIG. 8.
Figure 9B:
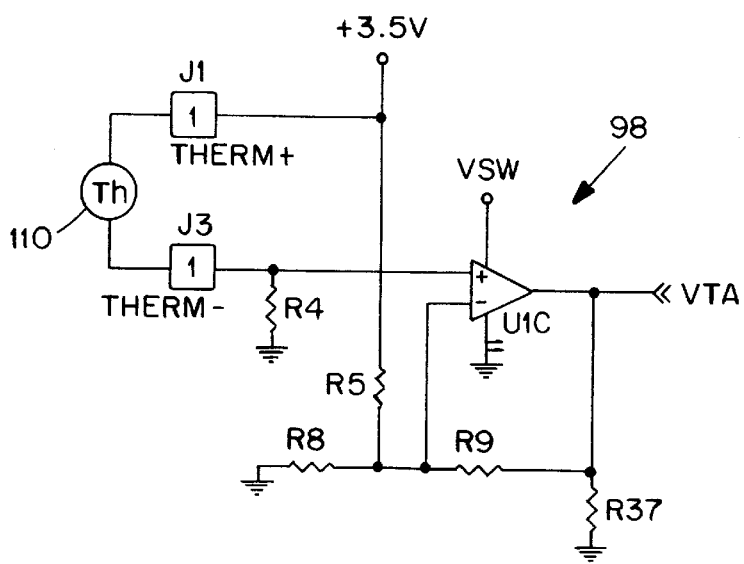
Figure 9C:
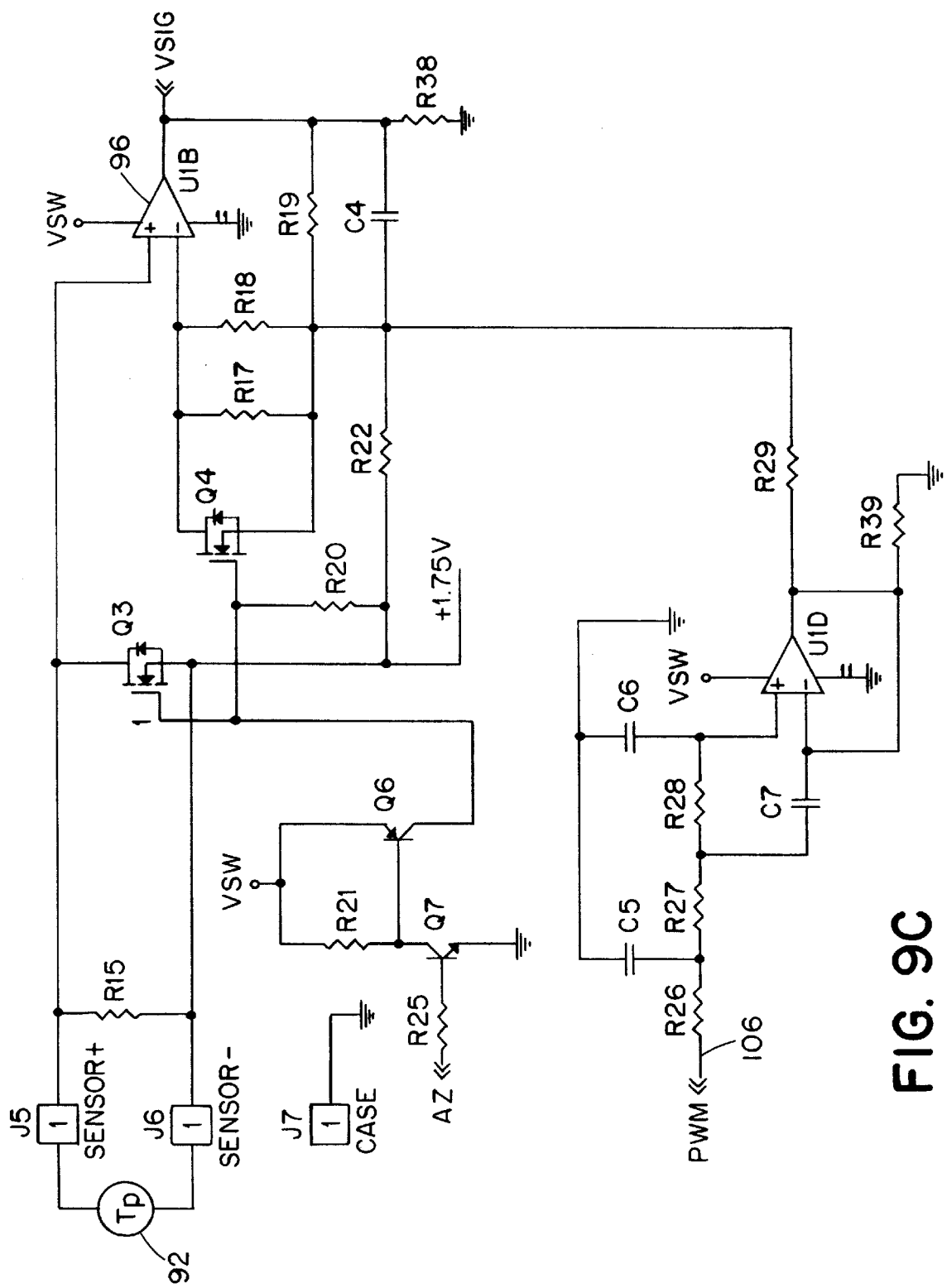

FIGS. 9A–9C present a specific circuit implementation of the FIG. 8 approach. The power control circuit is illustrated in FIG. 9A. When the switch S1 is pressed, power from the battery junction J2 is applied across diode D1, resistor Rio and zener diode D2 to apply power to terminal VSW. Terminal VSW applies power to the remainder of the system. The battery voltage is also seen by the microprocessor through resistor R1 at control line VSWITCH. The microprocessor then applies a control signal to line VON which turns transistors Q2 and Q1 on to maintain VSW high even after switch S1 is released. The voltage across zener diode D2 is applied to a voltage regulation circuit including amplifier U1A to generate a 3.5 volt reference required by the microprocessor. A 1.75 volt reference used in the amplifier circuit is also generated through a transistor Q5.

FIG. 9B illustrates the ambient temperature sensor 98 which actually measures the thermopile cold junction temperature. The 3.5 volt reference from the power control circuit is applied across a thermistor 110 in series with resistor R4. The temperature dependent voltage from the voltage divider of thermistor 110 and resistor R4 is applied to the non-inverting input of amplifier U1C to provide a temperature indication VTA. VTA is converted to a digital signal through the multiplexer/AD converter 90 of the microprocessor 80.

FIG. 9C illustrates the thermopile and amplifier circuit including the offset control. The output of thermopile 92 is applied to the non-inverting input of amplifier 96 to produce the signal $V_{SIG}$ applied to the multiplexer/AD converter 90. During calibration, the signal AZ from the microprocessor through transistors Q7 and Q6 closes the switch Q3, thus short circuiting the thermopile and isolating it from the amplifier 96. Included within the feedback circuit of the amplifier 96 are resistors R17 and R18 which balance the internal resistance of the thermopile and resistor R15, respectively, when the thermopile output is being amplified. During the calibration cycle those resistors are also shorted by switch Q4 to maintain balance.

The pulse wave modulated signal on line 106 of FIG. 8 is applied as control signal PWM in FIG. 9C. That signal is low pass filtered in an RC circuit (R27, R28, C5, C6) and applied through amplifier U1D to create an offset voltage at the output of amplifier U1D. With the thermopile isolated, the microprocessor controls that offset voltage to adjust the output of amplifier 96 to a desired level. Thereafter, the microprocessor maintains that offset voltage level. That offset compensates for the undesirable electrical offset of the amplifier and also creates the electrical offset needed to maintain the signal $V_{SIG}$ within the range of the A-D converter. Thereafter, the microprocessor changes signal AZ to open the switches Q3 and Q4 and allow detection of the voltage signal generated by the thermopile 92.

Figure 10A:
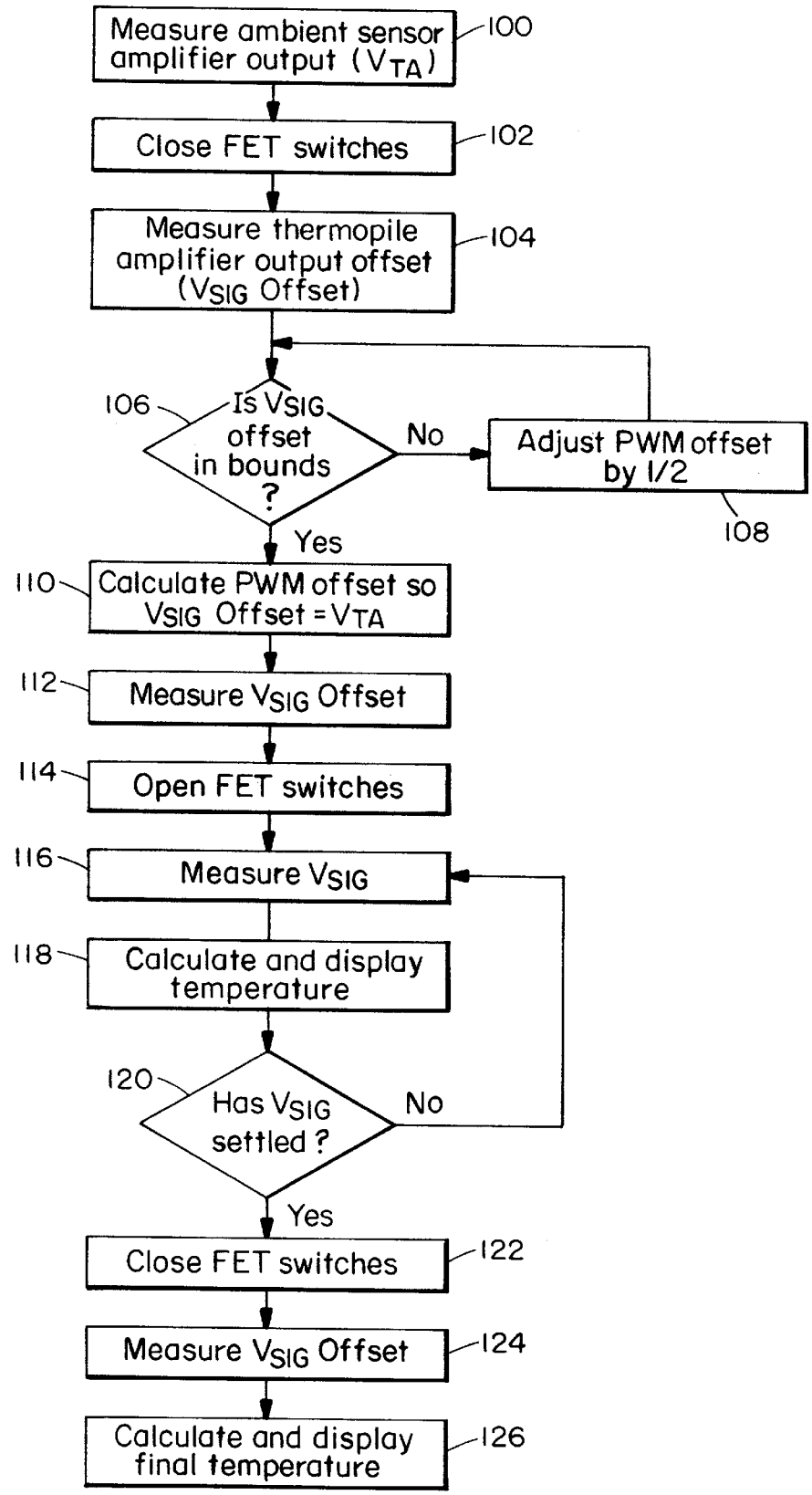
FIG. 10A is a flow chart of the measurement process including offset definition and FIG. 10B is a flow chart of digital processing to obtain target temperature.

Operation of the microprocessor in controlling the calibration process is illustrated by the flow chart of FIG. 10A. The processing of the detected signal on line $V_{SIG}$ is as illustrated by the flow chart of FIG. 10B.

As illustrated in FIG. 10A, the ambient temperature is measured at 100 by converting the output VTA from the sensor circuit 98 of FIG. 9B. The switches Q3 and Q4 are closed at 102. With no offset signal applied through PWM, the output of the amplifier 96 is the unwanted electrical offset which must be balanced out. That signal is converted as $V_{SIG}$ Offset at 104. If $V_{SIG}$ Offset is within the range of the A-D converter, it can be measured, and the process continues from 106. On the other hand, if the analog-to-digital converter saturates, it is necessary to apply a signal PWM to add an offset to the amplifier which brings the $V_{SIG}$ Offset signal to within range. Accordingly, the offset required to change the $V_{SIG}$ output by one-half the A-D converter range is applied at 108. The system loops through steps 106 and 108 as required to bring the $V_{SIG}$ Offset into a measurable range.

At 110, the PWM signal required to make $V_{SIG}$ Offset equal to $V_{TA}$ is calculated and applied to the circuit of FIG. 9C. At this point, $V_{SIG}$ approximates $V_{TA}$ so the signal should remain within range even when the thermopile is switched back into the circuit.

$V_{SIG}$ Offset is measured again at 112. The calculated $V_{SIG}$ Offset was only an approximation to assure that the AD converter remains within range. The critical value for later computation of target temperature is the actual offset measured at 112.

The FET switches Q3 and Q4 are then opened at 114 and $V_{SIG}$ is measured at 116. Temperature is calculated and displayed at 118 as the detector stabilizes. Until the $V_{SIG}$ signal stabilizes to a constant level, the system loops from 120 to remeasure $V_{SIG}$.

Once the temperature reading has stabilized, the FET switches Q3 and Q4 are again closed at 122 and $V_{SIG}$ Offset is measured at 124. This assures an accurate target temperature calculation in the event of any drift in $V_{SIG}$ Offset during the measurement process. The final target temperature is calculated and displayed at 126.

Figure 10B:
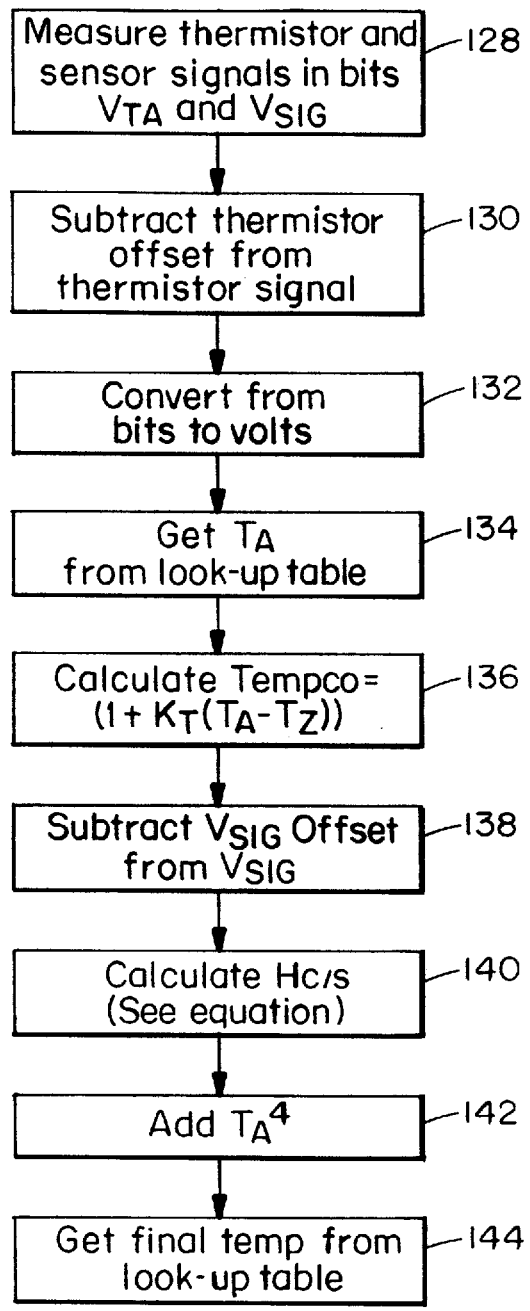

The target temperature calculations performed at 118 and 126 are presented in FIG. 10B. The voltages $V_{TA}$ and $V_{SIG}$ are measured at 128. A thermistor offset value stored during manufacturing calibration is subtracted from $V_{TA}$ at 130 and the resultant value is multiplied by 3.5 volts per 256 bits at 132 since the ambient temperature look-up table is based on a 3.5 volt range. The look-up table is addressed at 134 to obtain the ambient temperature value $T_A$.

A temperature coefficient Tempco which allows for the temperature dependence of the thermopile output is calculated at 136:

Tempco=(1+$K_T$($T_A$-$T_Z$))

where $K_T$ is a stored sensor specific gain constant and $T_Z$ was the temperature of the device stored during manufacturing calibration.

At 138, the measured $V_{SIG}$ Offset is subtracted from $V_{SIG}$ to obtain a value which indicates the value $(T_T^4-T_A^4)$. More specifically, Hc/s is computed at 140:

Hc/s=($V_{SIG}$-$V_{SIG}$ Offset)×Kh×(Tempco)

where
Kh=Sensor Gain Constant (Determined at calibration)

$T_T$=(Hc/s+$T_A^4$)$_{1/4}$

To obtain target temperature, $T_A^4$ is added to Hc/s at 142 and the fourth root is obtained by table look-up at 144.

Each of the look-up tables may be modified to account for compensations such as core temperature compensation and temperature dependant emissivity calibration as discussed above.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A radiation detector comprising:
   a radiation sensor mounted within a can for viewing a target through an infrared transparent window on the can; and
   a heat sink having a bore in which the can is positioned, thermal contact between the radiation sensor and the heat sink being made through a rear flange on the can with an insulating space about the can.

2. A radiation detector as claimed in claim 1 further comprising an elastomer in the bore behind the can and a cap fit to the heat sink to press against the elastomer to press the flange against a shoulder of the heat sink.

3. A radiation detector as claimed in claim 2 wherein a reflective cup is formed in the heat sink, the radiation sensor viewing a target through the cup, the cup being out of the field of view of the sensor.

4. A radiation detector as claimed in claim 3 further comprising a transparent film stretched across the cup.

5. A radiation detector as claimed in claim 4 wherein the film has a thickness of at least 1.1 mils.

6. A radiation detector as claimed in claim 4 wherein the film has a thickness of about 1.5 mils.

7. A radiation detector as claimed in claim 4 wherein the cup is dimensioned such that it has a mean distance from the end thereof of about 1/8 inch.

8. A radiation detector as claimed in claim 1 wherein the cap is a plug which fits within the bore.

9. A radiation detector as claimed in claim 8 wherein the plug is externally threaded.

10. A radiation detector as claimed in claim 1 wherein the cap has an opening therein through which electrical leads to the radiation sensor pass.

11. A radiation detector as claimed in claim 1 wherein the heat sink is mounted within a housing of low conductivity material, the RC time constant for change in temperature of the radiation sensor with change in temperature to which the housing is exposed being at least five minutes.

12. A radiation detector as claimed in claim 11 wherein the thermal time constant is at least 25 minutes.

13. A radiation detector as claimed in claim 11 wherein the sensor views a target through a window at an end of an extended housing.

* * * * *